United States Patent
Beele

(10) Patent No.: US 10,348,077 B2
(45) Date of Patent: Jul. 9, 2019

(54) SYSTEM AND METHOD FOR SEALING ONE END OF AN EXISTING CONDUIT THROUGH WHICH A NUMBER OF CABLES EXTEND

(71) Applicant: Beele Engineering B.V., Aalten (NL)

(72) Inventor: Johannes Alfred Beele, Aalten (NL)

(73) Assignee: Beele Engineering B.V., Aalten (NL)

(*) Notice: Subject to any disclaimer, the term of this patent is extended or adjusted under 35 U.S.C. 154(b) by 0 days.

(21) Appl. No.: 15/762,447

(22) PCT Filed: Sep. 26, 2016

(86) PCT No.: PCT/EP2016/072830
§ 371 (c)(1),
(2) Date: Mar. 22, 2018

(87) PCT Pub. No.: WO2017/051033
PCT Pub. Date: Mar. 30, 2017

(65) Prior Publication Data
US 2018/0278038 A1 Sep. 27, 2018

(30) Foreign Application Priority Data
Sep. 24, 2015 (NL) ..................................... 1041487

(51) Int. Cl.
*H02G 1/00* (2006.01)
*H02G 3/04* (2006.01)
(Continued)

(52) U.S. Cl.
CPC .............. *H02G 15/013* (2013.01); *H02G 1/00* (2013.01); *H02G 3/0406* (2013.01); *H02G 3/0481* (2013.01); *H02G 3/22* (2013.01)

(58) Field of Classification Search
CPC ...... H02G 15/013; H02G 1/00; H02G 3/0406; H02G 3/0481; H02G 3/22
See application file for complete search history.

(56) References Cited

U.S. PATENT DOCUMENTS 4,086,736 A * 5/1978 Landrigan ................ F16L 5/04
248/56
5,245,131 A * 9/1993 Golden .................. H02B 1/305
174/652

FOREIGN PATENT DOCUMENTS

| EP | 0 869 303 A2 | 10/1998 |
| WO | WO 2006/097290 A1 | 9/2006 |
| WO | WO 2009/000778 A1 | 12/2008 |

OTHER PUBLICATIONS

International Search Report and Written Opinion dated Dec. 8, 2016 in connection with International Application No. PCT/EP2016/072830.

(Continued)

*Primary Examiner* — Timothy J Thompson
*Assistant Examiner* — Rhadames Alonzo Miller
(74) *Attorney, Agent, or Firm* — Wolf, Greenfield & Sacks, P.C.

(57) ABSTRACT

A system for sealing one end of an existing conduit through which a number of cables extend and in which a number of elements are placed for holding each of the number of cables in a position in the conduit, the system comprising: a sealant for applying a first layer of sealant at an end of the existing conduit against the number of elements so that the first layer of sealant completely covers that end of the conduit as far as not occupied by any of the number of cables; a number of flexible elements which each have a first end for positioning that first end into the first layer of sealant when the first layer is still uncured, each of the number of flexible elements further having a second end at such a distance from the respective first end when the first ends are positioned in the first layer of sealant, that the second ends form together a structure against which a second layer of the sealant can be applied, a single-part or multiple part subsystem for constructing a rigid second conduit around the flexible elements (Continued)

from their respective first end up to and including their respective second end when these first ends are positioned in the first layer of sealant, so that the number of cables also extend through the second conduit and a first end of the second conduit is sealed off by the first layer of sealant and a second end of the second conduit can be sealed off by applying a second layer of sealant against the structure formed by the second ends of the number of flexible elements.

28 Claims, 13 Drawing Sheets

(51) Int. Cl.
 *H02G 3/22* (2006.01)
 *H02G 15/013* (2006.01)

(56) References Cited

OTHER PUBLICATIONS

International Preliminary Report on Patentability dated Apr. 5, 2018 in connection with International Application No. PCT/EP2016/072830.

* cited by examiner

SYSTEM AND METHOD FOR SEALING ONE END OF AN EXISTING CONDUIT THROUGH WHICH A NUMBER OF CABLES EXTEND

CROSS-REFERENCE TO RELATED APPLICATIONS

This application is a national stage filing under 35 U.S.C. § 371 of international application PCT/EP2016/072830, filed Sep. 26, 2016, which claims priority to Netherlands application 1041487, filed Sep 24, 2016, the disclosures of which are incorporated by reference herein their entireties.

One aspect of the invention relates to a system for sealing one end of an existing conduit through which a number of cables extend. Another aspect of the invention relates to a method for sealing one end of an existing conduit through which a number of cables extend. According to another aspect the invention relates to a sealed conduit system comprising a first conduit through which a number of cables extend.

BACKGROUND

In most engineered constructions, mobile or immobile, and particularly on-board of a ship, a floating construction or a non-floating off-shore construction for holding on-board human beings, one will find many pipes and/or cables extending from one compartment to another. For that purpose, floors, decks, walls or other types of partitions often comprise an opening so that the pipe and/or cable can indeed, via that opening, extend from one compartment to another. The opening may comprise a tubular passage, often referred to as a conduit. One could also consider such a conduit to be fittingly and sealingly installed into or onto the opening. Space which is in the conduit and not occupied by pipes and/or cables is usually occupied by a sealing. The purpose of the sealing is to stop undesired transport of physical phenomena through the conduit. For instance, the sealing may be designed to stop the flow of air, water, noise, fire, poisonous gases, smoke, etc., dampen noise and vibrations, and keep a fire for as long as possible isolated on one side of the conduit without spreading via the conduit to another compartment. The sealing systems are tested before they are put on the market so as to be able to assess their performance under exposure to predefined circumstances. Accordingly, sealing systems may be certified. For instance, a certificate may be issued for remaining intact under exposure to a nearby fire for the time of one hour. The number of pipes and/or cables extending through the conduit, the type of sealing applied, the temperatures exposed to, etc. are recorded on or with the certificate. The availability of these certificates facilitates choosing a particular sealing system for use, particularly on-board at a specific location for conduits through which a certain number of pipes and/or cables extend.

A number of sealing systems are known in the marketplace. One system is often referred to as the "block system". It was, for instance, installed on the Emma Maersk which according to the official accident report got flooded in the Suez Canal in February 2013 and almost sunk, partly due to a failure of the block system. The system comprises modular rubber blocks for placement in a conduit. A number of the blocks are provided with a hole for holding a cable. The blocks are built up from two half blocks, each having a recess that forms half the hole. There may also be wedge blocks, sometimes provided with bolts; there may be modular blocks without a hole for occupying surplus space in the conduit, and stay plates. The conduit may comprise a welded frame. In use, a number of cables of different diameters may extend through the conduit. Then, the conduit contains the modular blocks (the blocks with a hole for a cable and the blocks without such a hole). The wedged blocks are normally put between these modular blocks with the aim to make the construction of the modular blocks tight and firm. The stay plates are fitted with layers of these blocks and aim to keep these blocks in the right position in the welded frame. A mechanism may be available for putting the blocks under pressure aimed at tightening sealing by the blocks. Such mechanisms are often referred to as compression units. As explained in the accident report, the system failed on at least an individual component level.

With the block system, there is a need to compress the blocks after positioning in the welded frame, i.e. the conduit. Compressing the components will, in the long run, result in deterioration of these components, due to time-related phenomena like creep and stress relaxation. Deterioration not only occurs on the level of the components, but also on the level of the sheathing of the cables. These can be irreversibly deformed by the applied compression of the blocks surrounding a cable. As a result of this, replacing an existing sealing system by a similar sealing system comprising blocks having a hole, is highly unlikely to work well as the diameter of the cable may have changed.

In this context, reference is also made to IEC 60079-14, particularly clause 9.1.4 which indicates that "low smoke and/or fire resistant cables usually exhibit cold flow characteristics". This seems to be particularly relevant for thermoplastic materials which tend to flow when subjected to pressure at ambient temperature.

Given that certificates are issued on the basis of tests for which normally a brand new sealing system is applied, and as explained above a sealing system known in the marketplace deteriorates after installation over time, there is a need for (re-)sealing existing conduits through which a number of cables extend.

One way of re-sealing an existing conduit through which a number of cables extend would be to remove the existing sealing system, if possible, and then to install a system that is known to more reliably provide a sealing integrity over a long period of time, preferably without any need for maintenance or re-tightening. However, this would be a very costly event as it would entail very carefully removing the sealing system so as not to damage the cables and their present position. However, given that the present sealing system, as explained above, applies a pressure onto the sheathing of the cables extending through the conduit, uncontrolled deformation of the sheathing may have taken place. As a consequence thereof, there is no longer a well-defined diameter of the cables within the conduit, so that it is difficult to apply a new sealing system that would require accurate knowledge of the diameters of the cables in the conduit. Most importantly though, removing the existing sealing, or elements which hold the cables in position in the conduit, would be extremely time-consuming and lead to lengthy downtime of the engineered construction in which the conduit is present.

OBJECT OF THE INVENTION

It is an object of the invention to provide an answer to the problem of conduits which may no longer provide the desired sealing integrity.

SUMMARY OF THE INVENTION

Provided is a system for sealing one end of an existing conduit through which a number of cables extend and in which a number of elements are placed for holding each of the number of cables in a position in the conduit. The system comprises a sealant for applying a first layer of sealant at an end of the existing conduit against a number of elements so that the first layer of sealant covers that end of the conduit. The system further comprises a number of flexible elements which each have a first end for positioning that first end into the first layer of sealant when the first layer is still uncured. Each of the number of flexible elements further having a second end at such a distance from the respective first end when the first ends are positioned in the first layer of sealant, that the second ends form together a structure against which the second layer of the sealant can be applied. The system also comprises a single-part or multiple-part subsystem for constructing a rigid second conduit around the flexible elements from their respective first end up to and including their respective second end when the first ends are positioned in the first layer of sealant, so that the number of cables also extend through the second conduit and the first end of the second conduit is sealed off by the first layer of sealant and a second end of the second conduit can be sealed off by applying a second layer of sealant against the structure formed by the second ends of the number of flexible elements.

Further is provided a method for sealing an end of an existing conduit through which a number of cables extend and in which a number of elements are placed for holding each of the number of cables in a position in the conduit. The method comprises applying a sealant at an end of the existing conduit against the number of elements so as to form a first layer of sealant which covers that end of the conduit. The method further comprises providing a number of flexible elements which each have a first end. The method also comprises positioning the first ends of the flexible elements into the first layer of sealant when the first layer is still uncured. Each of the number of flexible elements further have a second end at such a distance from the respective first end that when the first ends are positioned in the first layer of sealant, the second ends form together a structure against which a second layer of the sealant can be applied. The method further comprises providing a single-part or multiple-part subsystem for constructing a rigid second conduit around the flexible elements. The conduit extends from the respective first ends up to and including the respective second ends when these first ends are positioned in the first layer of sealant, so that the number of cables also extend through the second conduit and the first end of the second conduit is sealed off by the first layer of sealant and a second end of the second conduit can be sealed off by applying a second layer of sealant against the structure formed by the second ends of the number of flexible elements.

The above system and the above method not only allow for obtaining a suitable sealing for the existing conduit, these also allow for re-sealing without having to remove the existing sealing from the original conduit.

Further is provided a sealed conduit system comprising a first conduit through which a number of cables extend and which comprises a number of elements for holding each of the number of cables in a position in the first conduit. The conduit system further comprises the first layer of sealant at an end of the first conduit against a number of elements so that the first layer of sealant covers that end of the conduit. The conduit system further comprises a number of flexible elements which each have a first end positioned into the first layer of sealant. Each of the number of flexible elements further having a second end. At a distance from the respective first end, the second ends form together a support structure. The conduit system further comprises a rigid second conduit around the flexible elements from their respective first ends up to and including their respective second ends, so that the number of cables also extends through the second conduit. The conduit system also comprises a second layer of sealant against the support structure formed by the second ends of the number of flexible elements, therewith sealing off the second conduit.

DETAILED DESCRIPTION

The invention is further briefly explained whilst referring to a number of illustrations shown in FIGS. 1-13.

Figure 7:
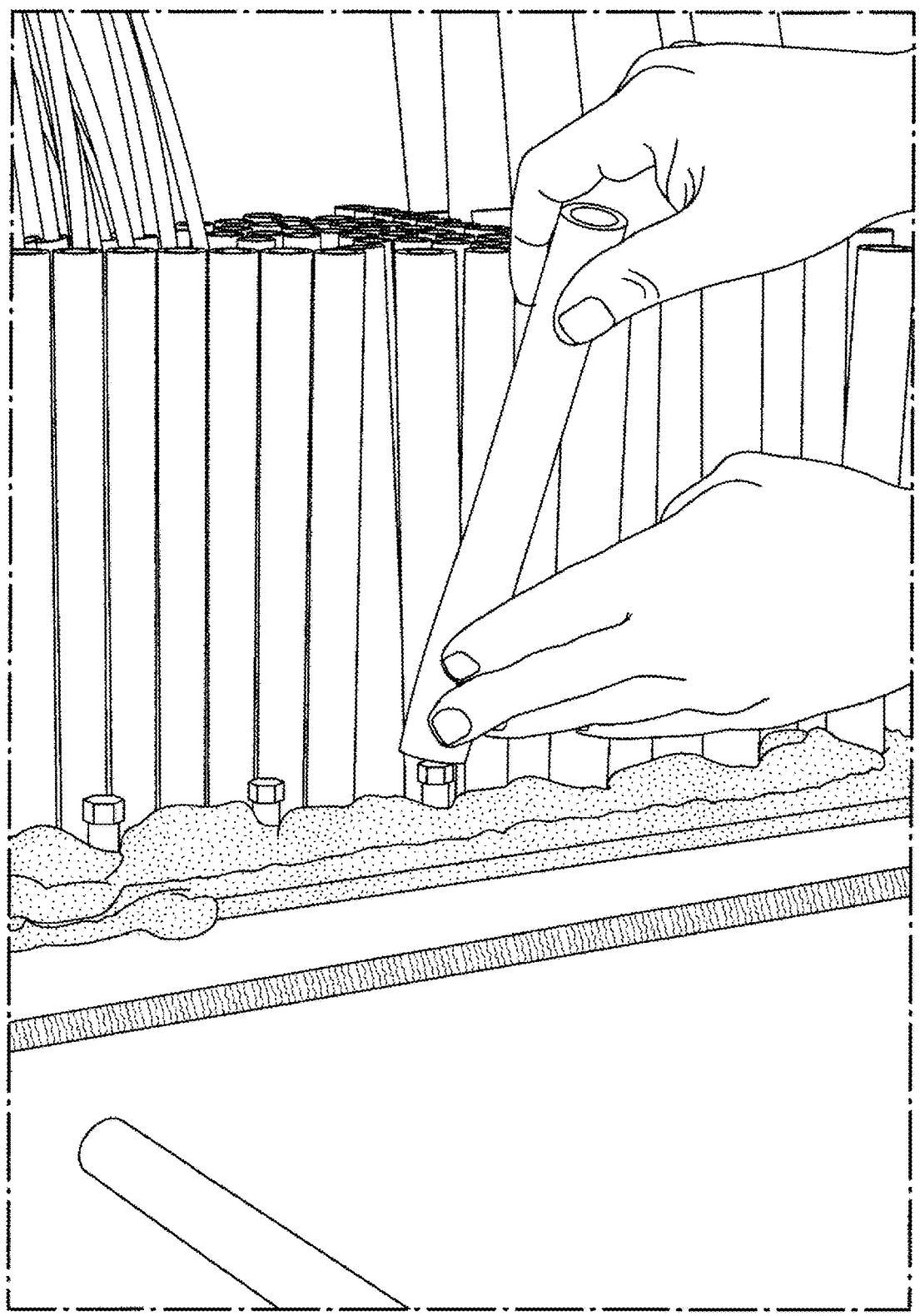
FIG. 7 shows a step of an embodiment of a method according to the invention.

An existing conduit through which a number of cables extend and in which a number of elements are placed for holding each of the number of cables could be as shown in WO 2010/090579 A1, FIG. 7 thereof. For the sake of clarity, note the cables are not shown in that FIG. 7. The existing conduit shown in the present Figures is indeed very similar to the conduit shown in FIG. 7 of WO 2010/090579 A1. That is, a number of such conduits, and such elements therein for holding a number of cables in position in the conduit, are placed next to each other to form the present conduit. This is only an example though. The existing conduit as shown as an example is also provided with a so-called compression unit, like reference 718 in WO 2010/090579 A1. A system of which parts are being applied as shown in the figures showing the step of an embodiment of a method according to the invention may comprise a system as is described in WO 2008/104237 A1. The text, accompanying FIG. 8 in WO 2008/104237 A1, starting on page 16, the final paragraph thereof, which ends on page 17, is herewith incorporated by references.

Clearly, the relatively flexible elements according to the present invention may be of a thermally substantially expandable type (elements 11 in WO 2008/104237 A1), but may alternatively also be of vulcanized rubber (elements 4 in WO 2008/104237 A1). The thermally substantially expandable types may have a longitudinal slit so as to be placed such that the respective sleeve can surround a cable. The sleeves made of vulcanized rubber may be without a longitudinal slit and may be placed in a conduit, not in itself surrounding a cable. The flexible elements, when of vulcanized rubber, may be so-called NOFIRNO sleeves as commercially available from the Applicant. The flexible element, when of the thermally substantially expandable type, may be so-called RISE sleeves, which are equally available from the Applicant. The sealant may be NOFIRNO sealant, non-expandable, as commercially available from the Applicant. The sealant may also be a so-called FIWA sealant, thermally expandable, as equally commercially available from the Applicant. The sealant and flexible elements may equally be as described in PCT/EP2015/070721 (as yet unpublished).

A single-part or multiple-part subsystem for constructing a rigid conduit around the flexible elements is available for the existing conduit, may be made of one sheet of folded metal so as to fit to the existing conduit, may be bolted to the existing conduit or to a partitioning construction element into which the existing conduit is mounted for passing cables from one side of the partitioning construction element to another side of the partitioning construction element. The second conduit may also be constructed on the basis of a multitude of parts. The second conduit is rigid relative to the flexible elements and the flexible elements are elements which are flexible relative to the second conduit.

Particularly when the single-part or multiple part subsystem for constructing a rigid second conduit is before reaching a constructed condition or in a constructed condition is mechanically fixable to the existing conduit (or partitioning construction element), a gasket may be placed between the rigid second conduit and the existing conduit (or partitioning construction element). This will prevent the occurrence of leaking at that position. Thus, the "interface" sill then be gastight. The gasket may be of a high temperature resistant material. For instance, Thermiculite 815 of the Flexitallic group may be a suitable gasket material. It comprises a high temperature, chemically resistant sealing material comprising exfoliated vermiculite reinforced with a tanged stainless steel core.

Figure 1:
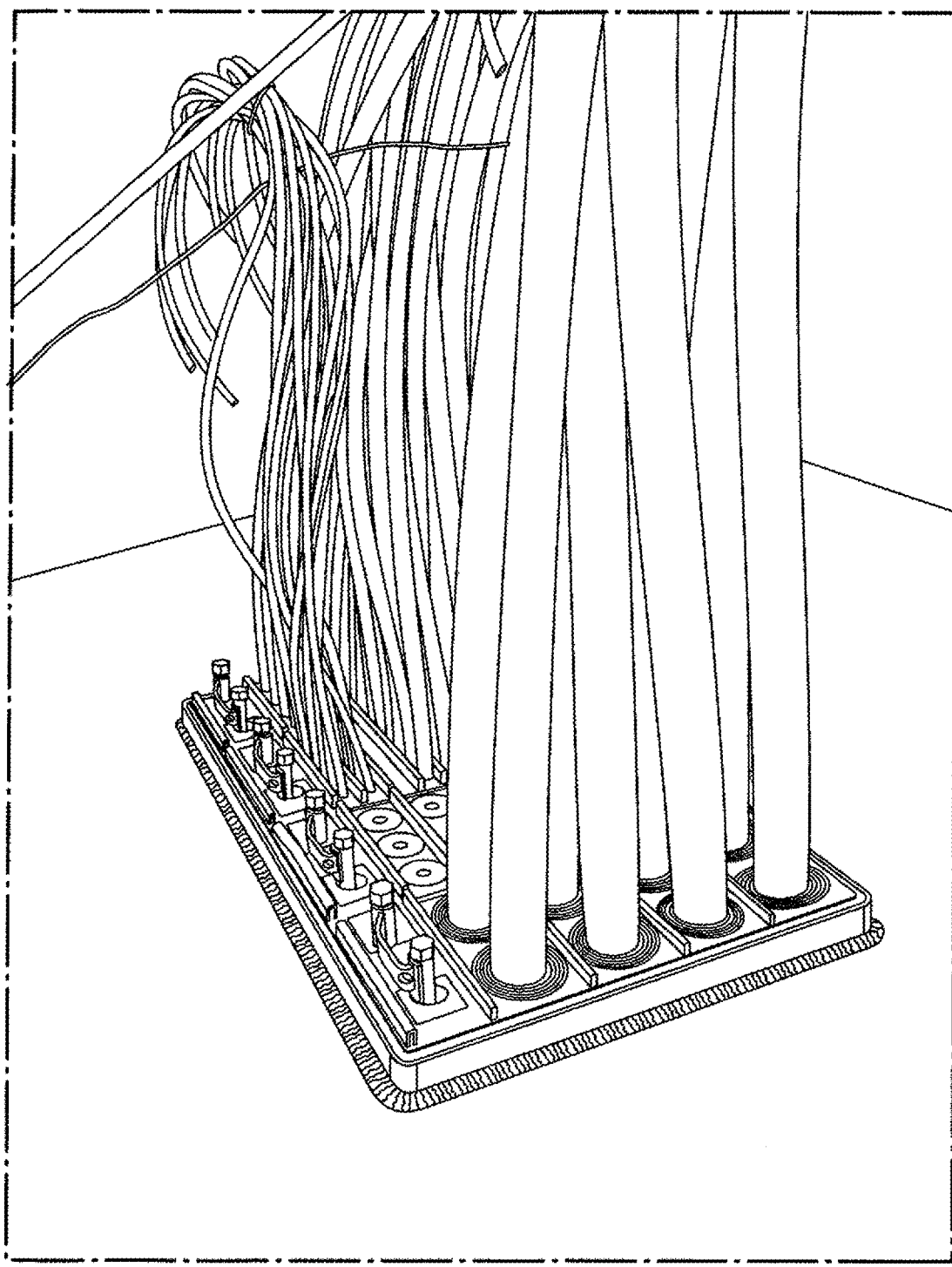
FIG. 1 shows an existing conduit before application of an embodiment of a system according to the invention and before using an embodiment of a method according to the invention.
Figure 2:
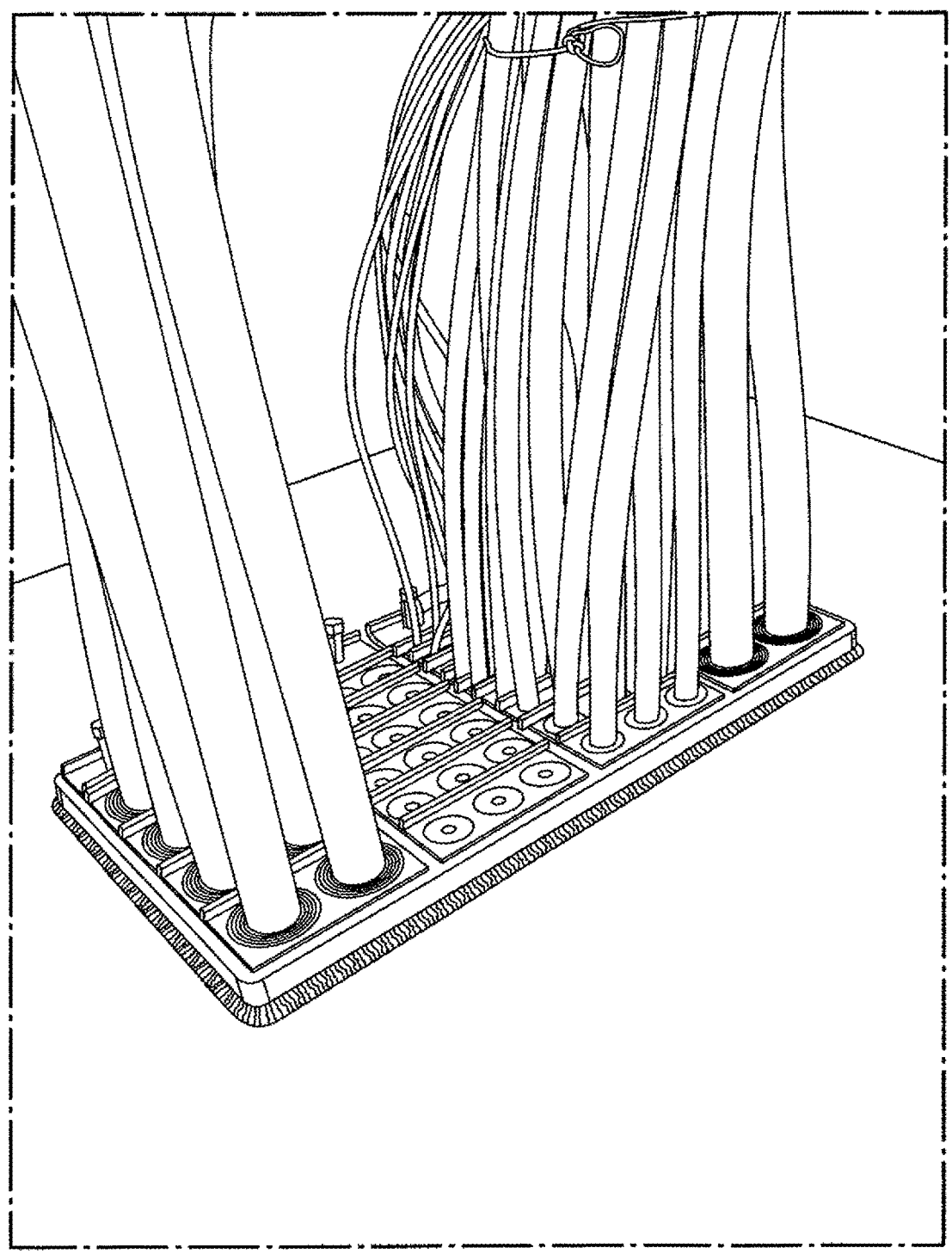
FIG. 2 shows the existing conduit shown in FIG. 1 as viewed from a different angle.
Figure 3:
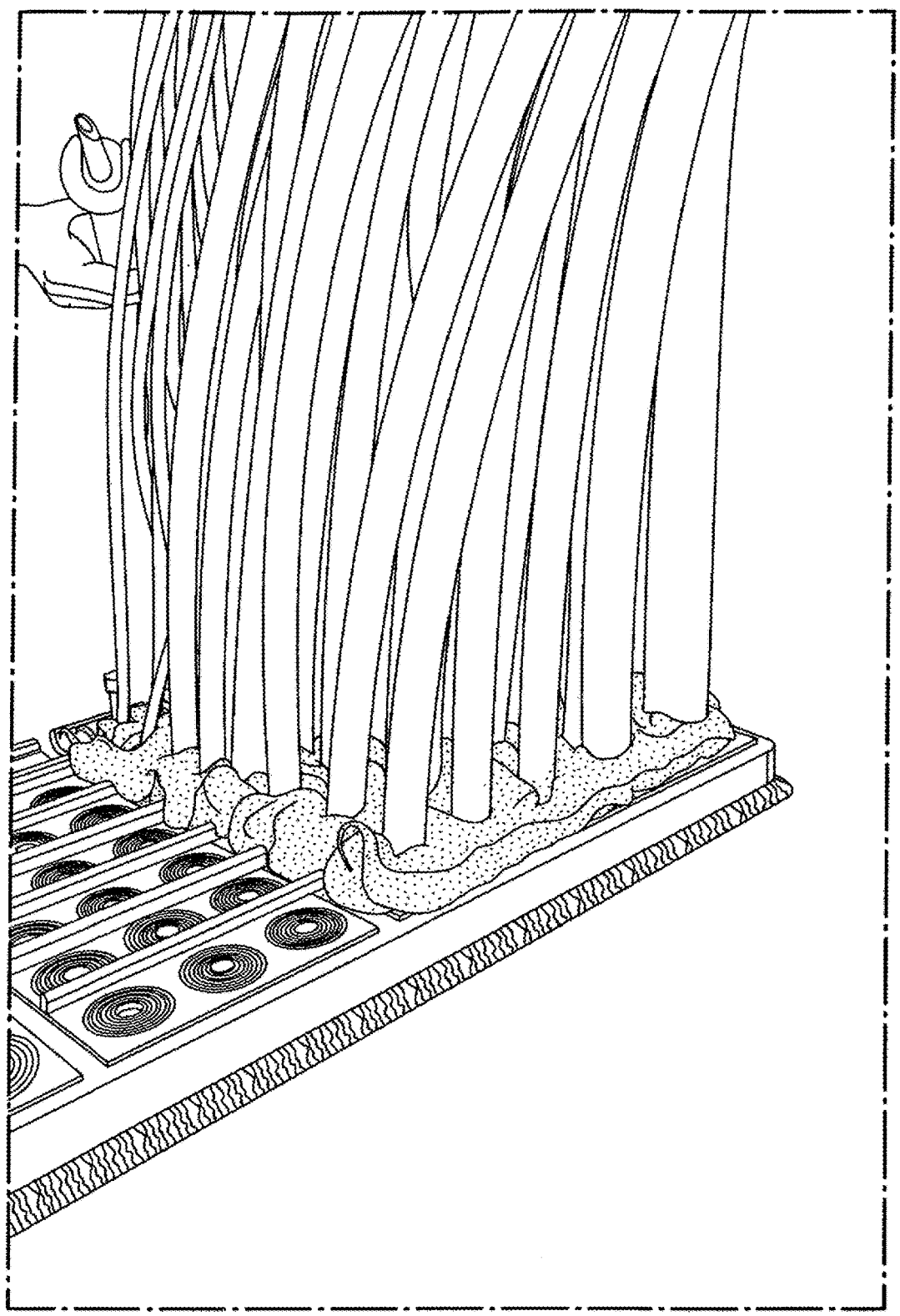
FIG. 3 shows the application of a step of an embodiment of a method according to the invention.

FIGS. 1, 2 and 3 show that a number of cables extend through an existing conduit and that a number of elements are placed for holding each of the number of cables in a position in the conduit.

Figure 4:
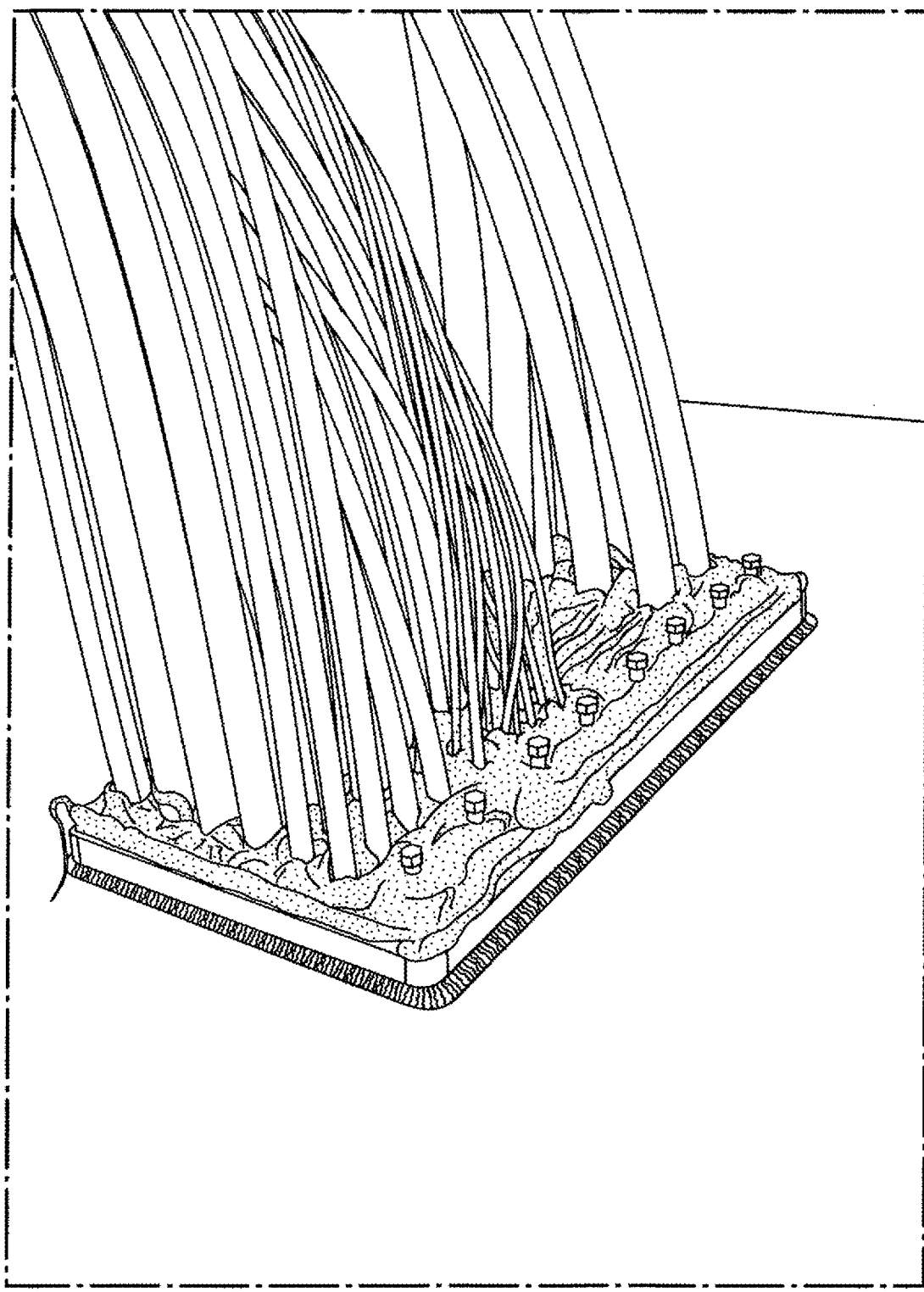
FIG. 4 shows a step of an embodiment of a method according to the invention.
Figure 5:
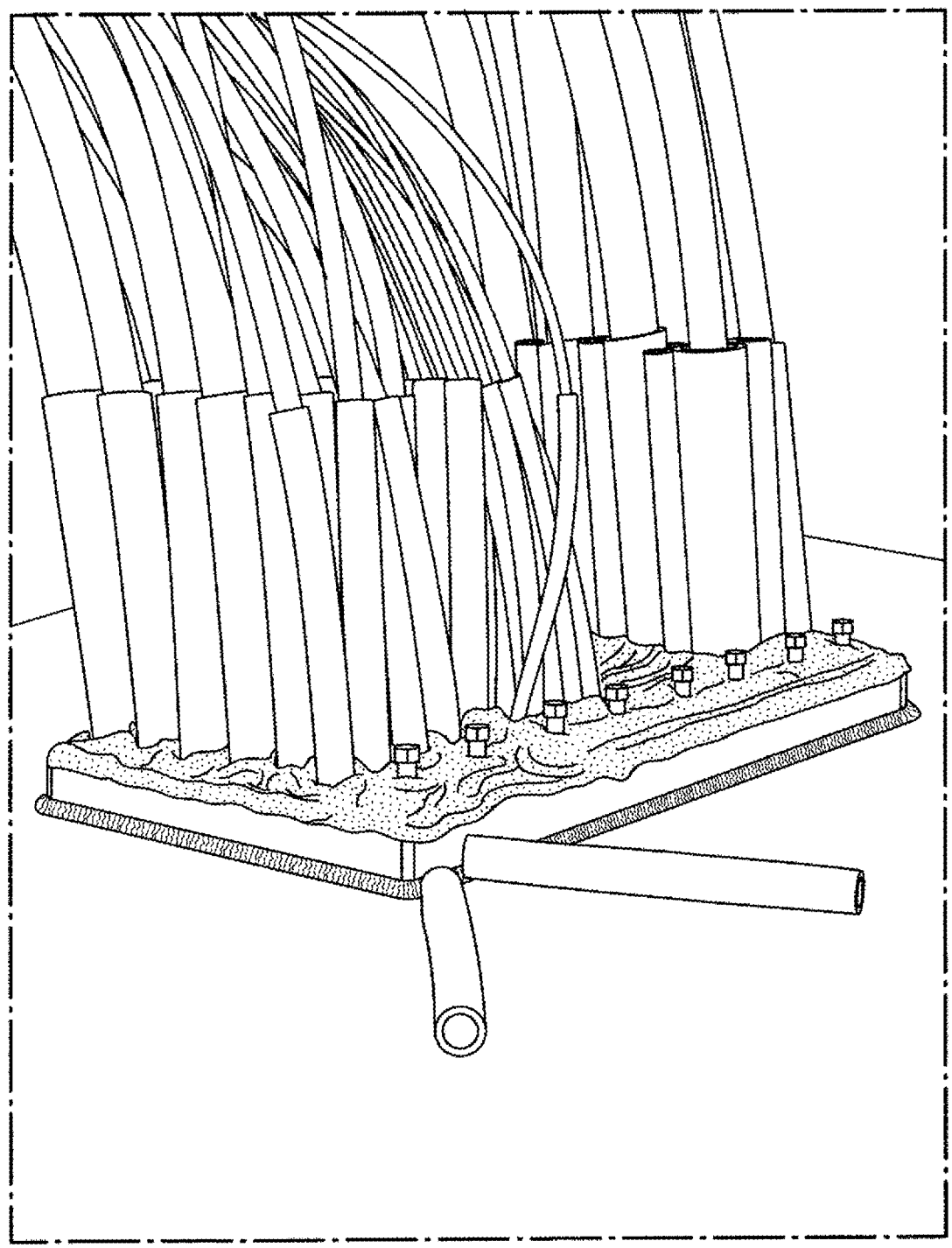
FIG. 5 shows a result of a step of an embodiment of a method according to the invention.
Figure 6:
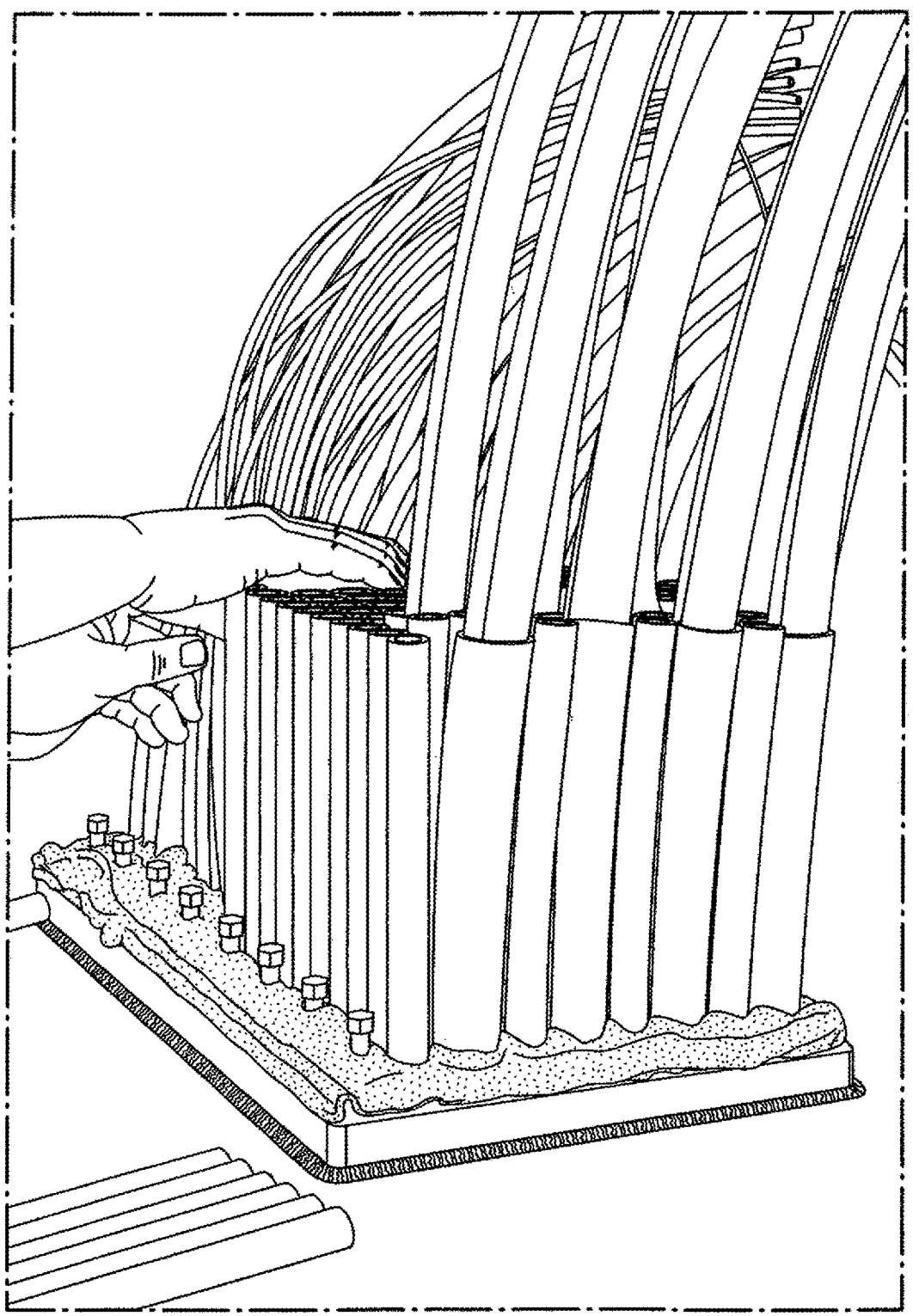
FIG. 6 shows a step of an embodiment of a method according to the invention.

FIGS. 3, 4 and 5 show the application of a first layer of sealant at an end of the existing conduit against the number of elements. From FIG. 5 it is clear that this is preferably done such that the first layer of sealant completely covers that end of the conduit as far as not occupied by any of the number of cables (or any of the screws for tightening the respective compression unit).

In FIGS. 5-8 it is shown that a number of flexible elements which each have a first end are positioned into the first layer of sealant when the first layer is still uncured. Each of the number of flexible elements further has a second end at such a distance from the respective first end that when the first ends are positioned in a first layer of sealant, the second ends form together a structure against which a second layer of the sealant can be applied.

Figure 8:
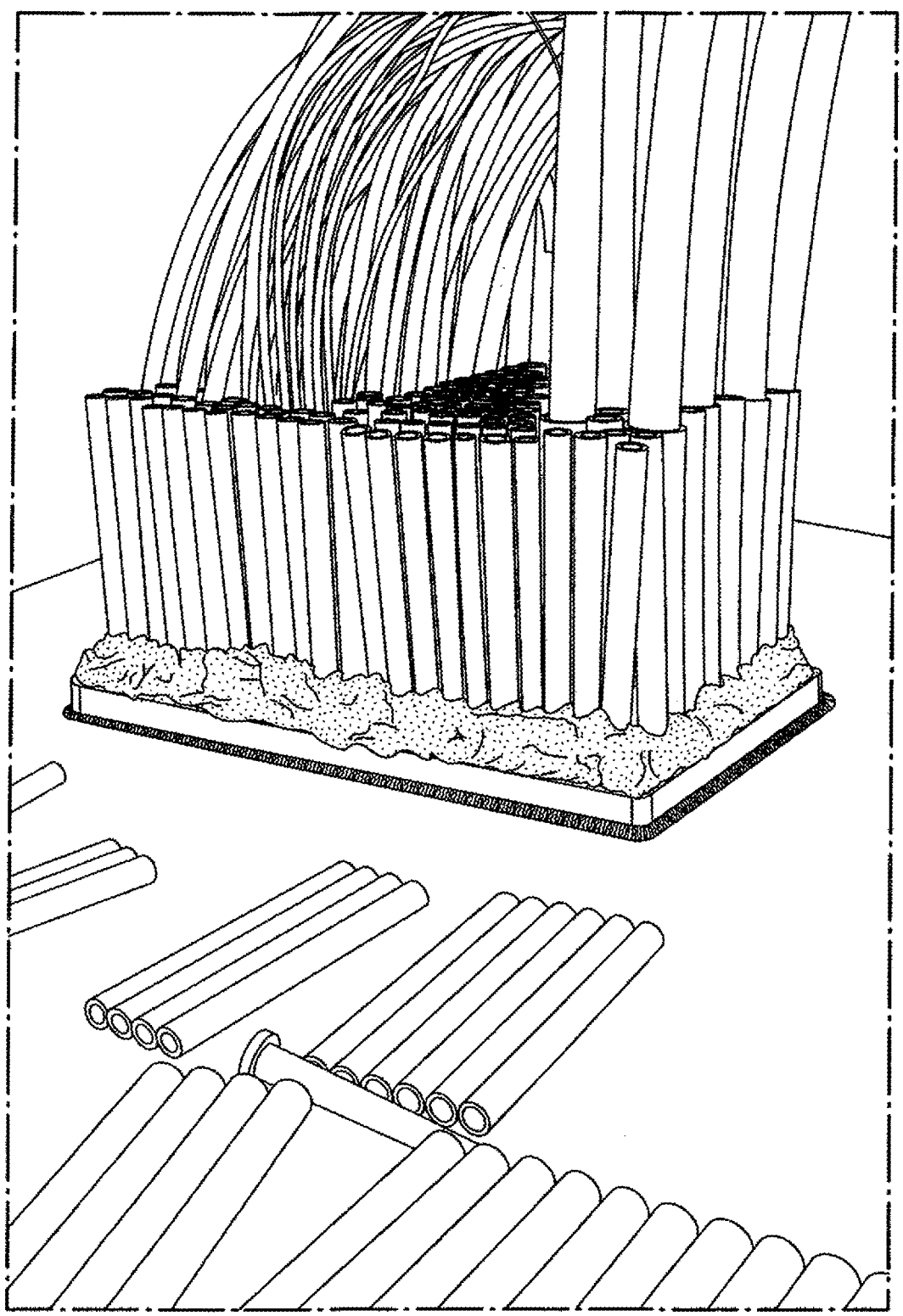
FIG. 8 shows a result of a step of an embodiment of a method according to the invention.
Figure 9:
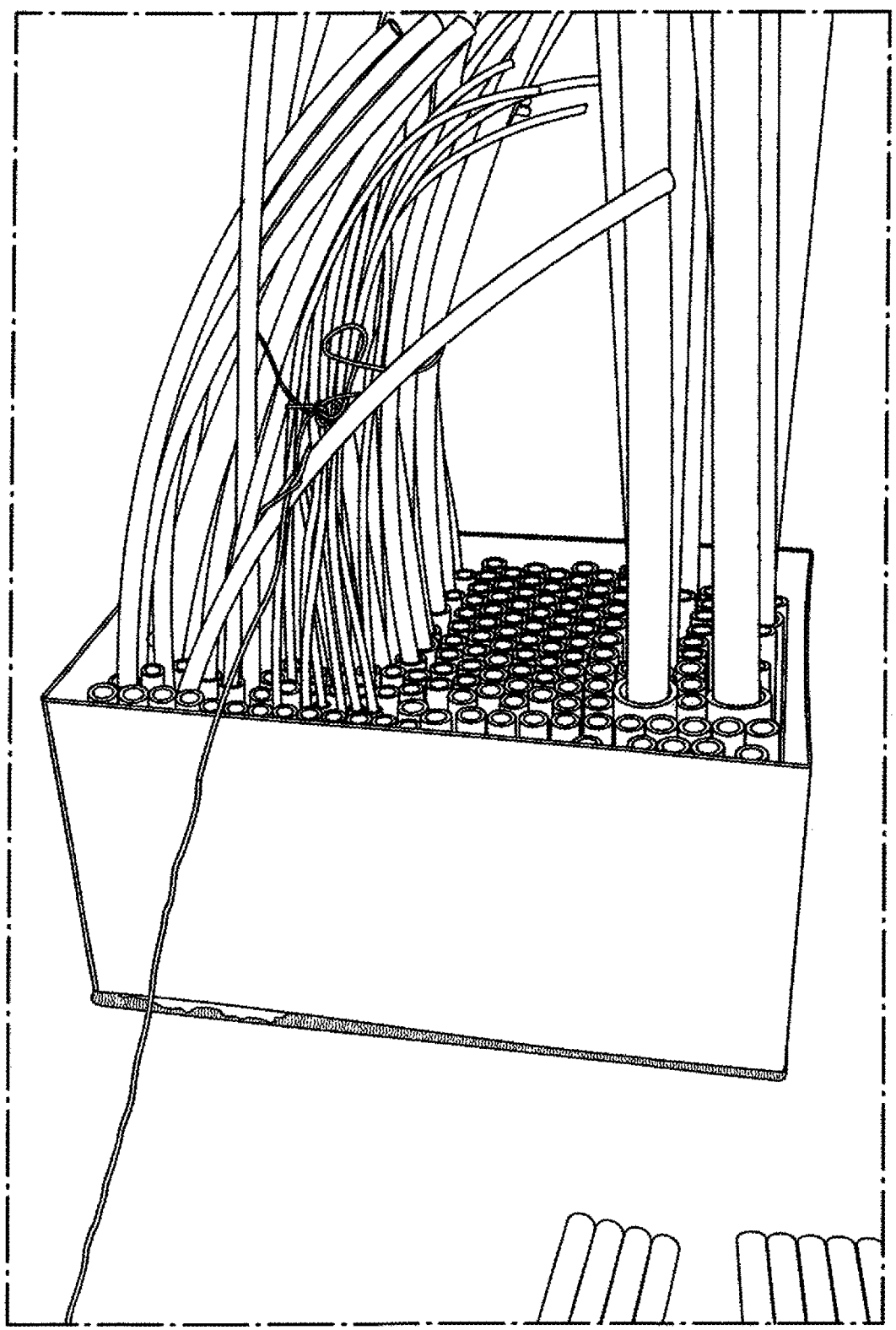
FIG. 9 shows a result of a step of an embodiment of a method according to the invention.
Figure 10:
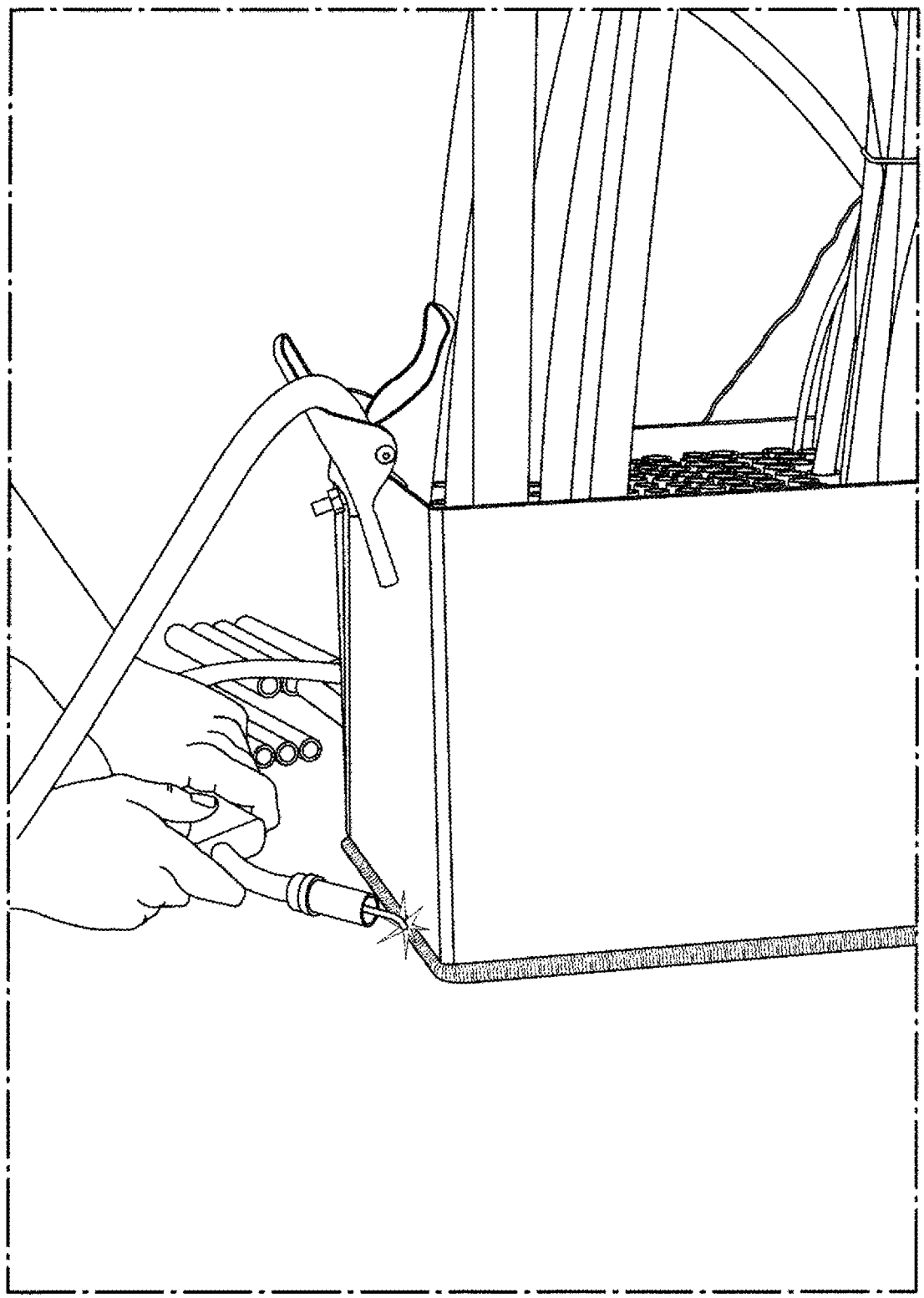
FIG. 10 shows a step of an embodiment of a method according to the invention.
Figure 11:
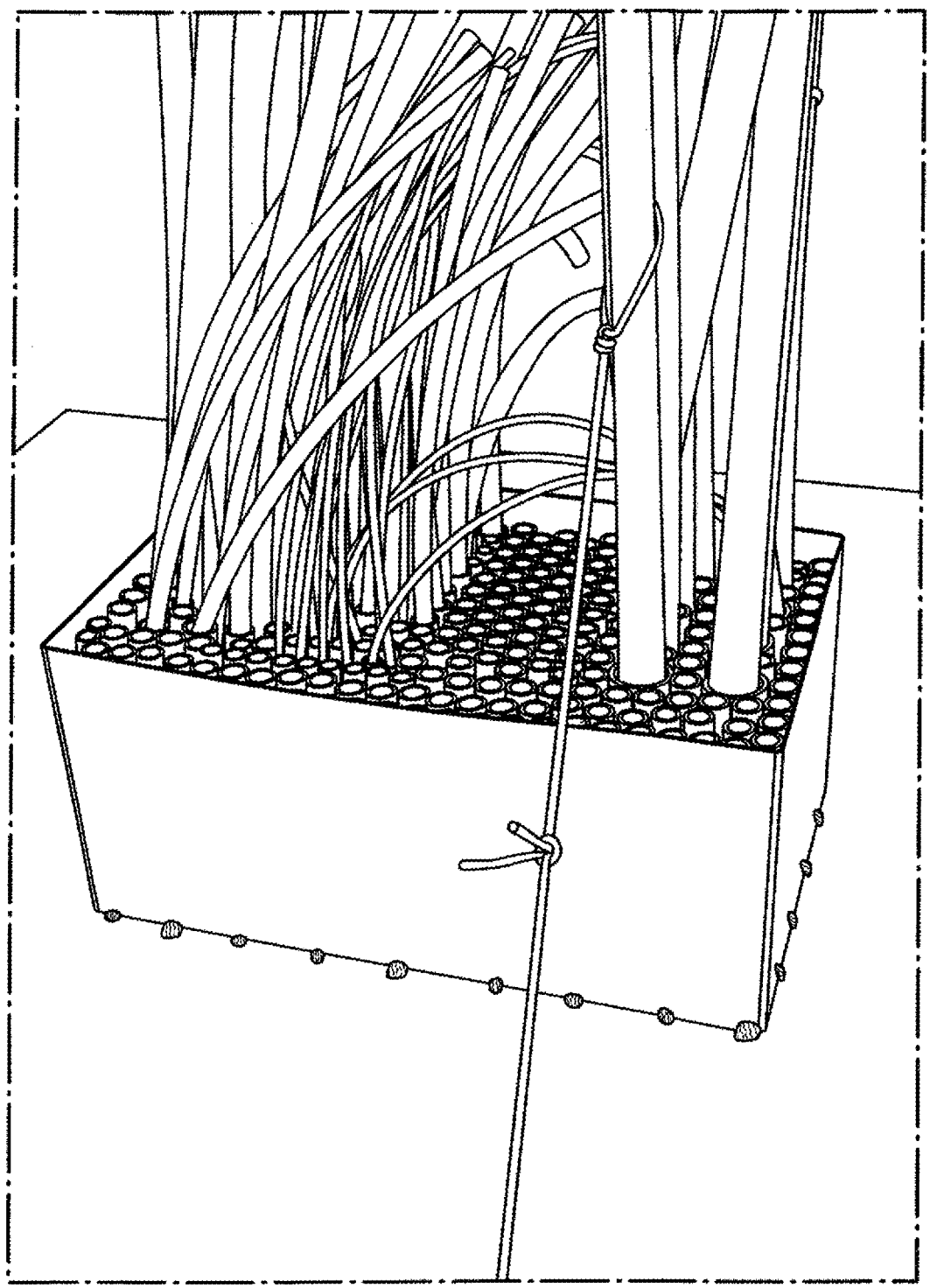
FIG. 11 shows a result of use of an embodiment of a system according to the invention.
Figure 12:
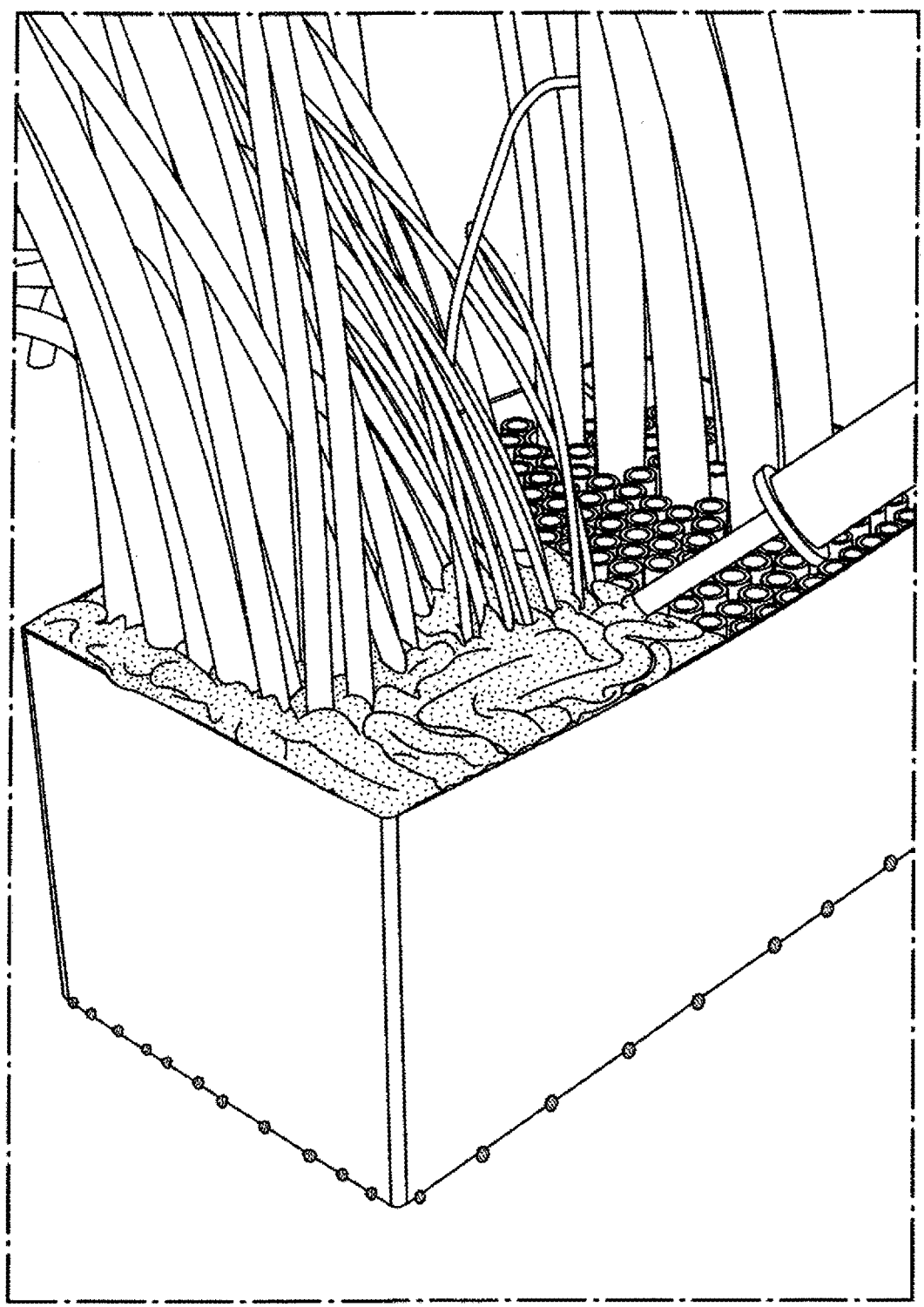
FIG. 12 shows a step of an embodiment of a method according to the invention.
Figure 13:
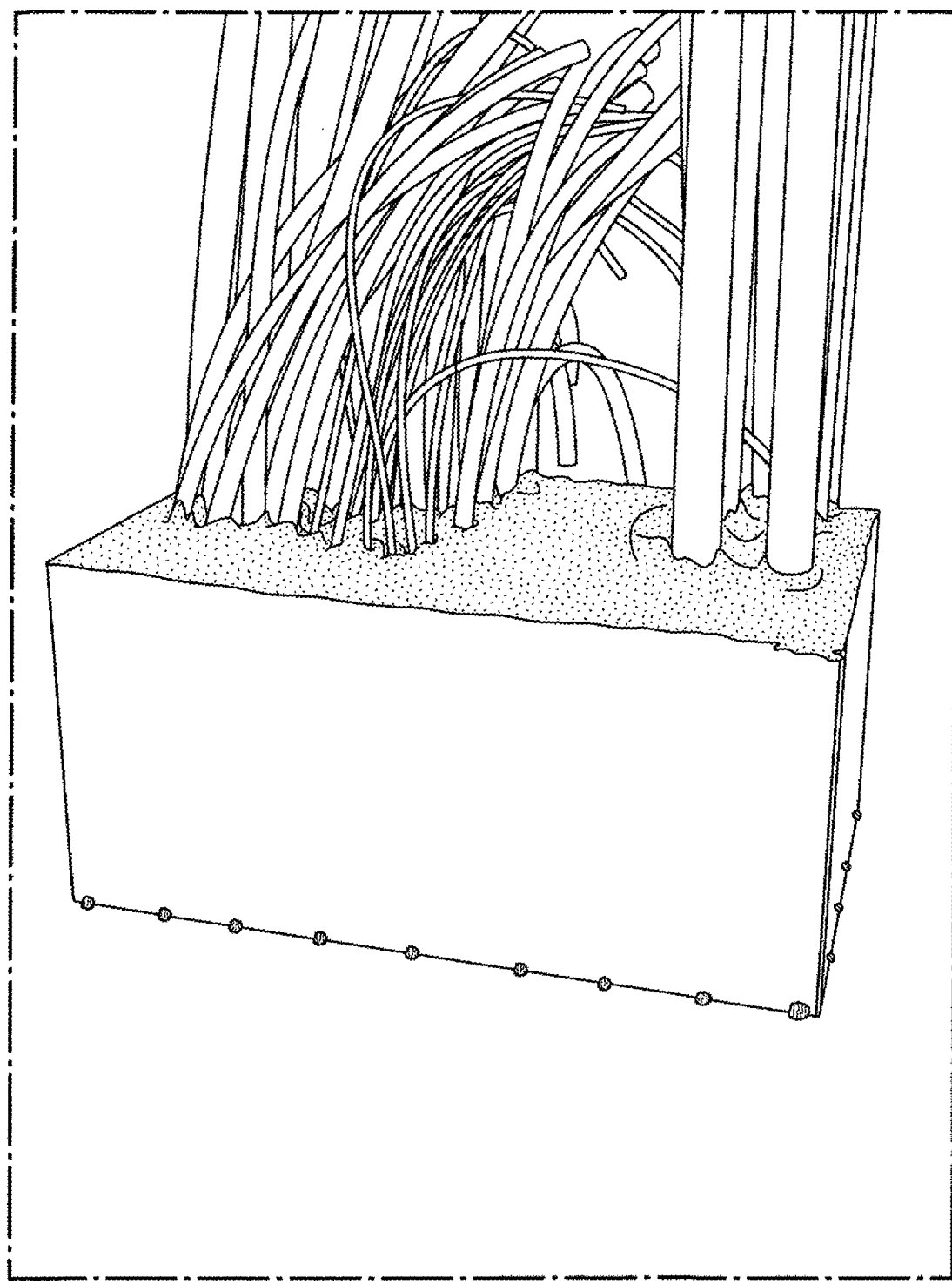
FIG. 13 shows an end result of an embodiment of a method according to the invention and a result of use of an embodiment of a system according to the invention.

As of FIG. 8 we see a subsystem, in this embodiment a single-part system, for constructing a rigid second conduit around the flexible elements, from their first respective ends up to and including their respective second end, so that the number of cables also extend from the second conduit and the first end of the second conduit is sealed off by the first layer of sealant. The second ends form together a structure against which a second layer of the sealant can be applied as shown in FIGS. 12 and 13.

An embodiment of a system according to the invention may be such that the single-part or multi-part subsystem for constructing a rigid second conduit has in constructed condition a length is between 1-6 cm longer than the distance that is for each flexible element between the first and the second ends. The length of the conduit being measured in a direction into which the cables in the conduit extend. Preferably, the length is 3-4 cm longer than the distance that is for each flexible element between the first and the second end.

Although not shown, the single-part subsystem and the multiple-part system for constructing a rigid second conduit has in constructed condition in longitudinal direction a seam, that may be closed by welding or may be formed by a mechanical connection. Preferably the seam is sealed off, for instance using a sealant or strip of rubber material. The second rigid conduit may also be based on a multiple-part subsystem for constructing a rigid second conduit (not shown).

As discussed, the second rigid conduit may be fixable to the first (existing) conduit. However, it is not inconceivable that the second rigid conduit is held in position by adherence to the first layer of sealant, for instance by pressing a rim of the second rigid conduit into the first layer of sealant when this is still uncured.

It is to be noted that where a first layer of sealant is applied, this first layer preferably completely covers the end of the existing conduit as far as not occupied by any of the number of cables and/or any of the screws for tightening a compression unit.

Although the order of steps of the method is to an extent relevant in that for instance first at least a part of a first layer of sealant is applied before the flexible elements can be inserted into such a layer, there may also be some repeating of earlier steps after having started or even completed a later step. That is, the first sealing layer may be topped up and/or further be applied after application of the flexible elements and/or even after positioning the second rigid conduit. Equally, another number of flexible elements may be positioned in the first layer of sealant after application of the second rigid conduit.

Many variations and modifications are possible. Each of these are considered to be within the framework of the invention as defined by the appended claims.

The invention claimed is:

1. A system for sealing one end of an existing conduit through which a number of cables extend and in which a number of elements are placed for holding each of the number of cables in a position in the existing conduit, the system comprising:
   a sealant for applying a first layer of sealant at an end of the existing conduit against the number of elements so that the first layer of sealant covers that end of the existing conduit;
   a number of flexible elements which each have a first end for positioning that first end into the first layer of sealant when the first layer of sealant is still uncured, each of the number of flexible elements further having a second end at such a distance from the respective first end when the first ends are positioned in the first layer of sealant, that the second ends form together a structure against which a second layer of the sealant can be applied; and a single-part or multiple part subsystem for constructing a rigid second conduit around the flexible elements from their respective first end up to and including their respective second end when these first ends are positioned in the first layer of sealant, so that the number of cables also extend through the second conduit and a first end of the second conduit is sealed off by the first layer of sealant and a second end of the second conduit can be sealed off by applying a second layer of sealant against the structure formed by the second ends of the number of flexible elements.

2. The system according to claim 1, wherein the second conduit is rigid relative to the flexible elements.

3. The system according to claim 2, wherein the flexible elements are elements which are flexible relative to the second conduit.

4. The system according to claim 1, wherein the single-part or multiple part subsystem for constructing a rigid second conduit is before reaching a constructed condition or in a constructed condition fixable to an existing conduit or a partitioning construction element into which the existing conduit is mounted for passing cables from one side of the partitioning construction element to another side of the partitioning construction element.

5. The system according to claim 4, wherein the system comprises a gasket for placement between the rigid second conduit and the existing conduit or partitioning construction element into which the existing conduit is mounted.

6. The system according to claim 1, wherein the single-part or multiple part subsystem for constructing a rigid second conduit is in constructed condition weldable to the existing conduit or a partitioning construction element, or mechanically fixable to the existing conduit or the partitioning construction element.

7. The system according to claim 1, wherein the single-part or multiple part subsystem for constructing a rigid second conduit has in constructed condition a length that is between 1 and 6 centimeters longer than the distance that is for each flexible element between the first end and the second end.

8. The system according to claim 1, wherein the single-part or multiple part subsystem for constructing a rigid second conduit has in constructed condition in longitudinal direction a seam that is formed by welding, or by a mechanical connection.

9. The system according to claim 8, wherein the seam is sealed off.

10. A method for sealing an end of an existing conduit through which a number of cables extend and in which a number of elements are placed for holding each of the number of cables in a position in the existing conduit, the method comprising:
applying a sealant at an end of the existing conduit against the number of elements so as to form a first layer of sealant which covers that end of the existing conduit;
providing a number of flexible elements which each have a first end, positioning the first ends of the flexible elements into the first layer of sealant when the first layer of sealant is still uncured, each of the number of flexible elements further having a second end at such a distance from the respective first end that when the first ends are positioned in the first layer of sealant, the second ends form together a structure against which a second layer of the sealant can be applied; and
providing a single-part or multiple part subsystem for constructing a rigid second conduit around the flexible elements, the existing conduit extending from the respective first ends up to and including the respective second ends when these first ends are positioned in the first layer of sealant, so that the number of cables also extend through the second conduit and a first end of the second conduit is sealed off by the first layer of sealant and a second end of the second conduit can be sealed off by applying a second layer of sealant against the structure formed by the second ends of the number of flexible elements.

11. The method according to claim 10, wherein the second conduit is rigid relative to the flexible elements.

12. The method according to claim 10, wherein the flexible elements are elements which are flexible relative to the second conduit.

13. The method according to claim 10, comprising fixing the single-part or multiple part subsystem for constructing a rigid second conduit to the existing conduit or to a partitioning construction element into which the existing conduit is mounted for passing cables from one side of the partitioning construction element to another side of the partitioning construction element.

14. The method according to claim 13, wherein the fixing comprises mechanically fixing or welding.

15. The method according to claim 14, wherein the method further comprises positioning a gasket such that it ends up between the rigid second conduit and the existing conduit or partitioning construction element into which the existing conduit is mounted.

16. The method according to claim 10, wherein the single-part or multiple part subsystem for constructing a rigid second conduit has in constructed condition a length that is between 1 and 6 centimeters longer than the distance that is for each flexible element between the first end and the second end.

17. The method according to claim 10, welding or mechanically connecting at least two edges of the single-part or multiple part subsystem for constructing the rigid second conduit.

18. The method according to claim 17, comprising providing a sealing to the at least two edges.

19. A sealed conduit system comprising a first conduit through which a number of cables extend and which comprises a number of elements for holding each of the number of cables in a position in the first conduit, the conduit system further comprising:
a first layer of sealant at an end of the first conduit against the number of elements so that the first layer of sealant covers that end of the first conduit;
a number of flexible elements which each have a first end positioned into the first layer of sealant, each of the number of flexible elements further having a second end and at a distance from the respective first end, the second ends forming together a support structure; a rigid second conduit around the flexible elements from their respective first ends up to and including their respective second ends, so that the number of cables also extend through the second conduit; and
a second layer of sealant against the support structure formed by the second ends of the number of flexible elements therewith sealing off the second conduit.

20. The sealed conduit system according to claim 19, wherein the second conduit is a construction that is made from a single-part or multiple part subsystem for constructing a rigid second conduit.

21. The sealed conduit system according to claim 19, wherein the second conduit is rigid relative to the flexible elements.

22. The sealed conduit system according to claim 19, wherein the flexible elements are elements which are flexible relative to the second conduit.

23. The sealed conduit system according to claim 19, wherein the rigid second conduit is fixed to the first conduit or a partitioning construction element into which the first conduit is mounted for passing cables from one side of a partitioning construction element to another side of the partitioning construction element.

24. The sealed conduit system according to claim 19, wherein the rigid second conduit is mechanically fixed or is welded to the first conduit or to a partitioning construction element into which the first conduit is mounted for passing cables from one side of a partitioning construction element to another side of the partitioning construction element.

25. The sealed conduit system according to claim 24, wherein a gasket is positioned between the rigid second conduit and the first conduit or partitioning construction element into which the first conduit is mounted.

26. The sealed conduit system according to claim 19, wherein the rigid second conduit has a length that is between 1 and 6 centimeters longer than the distance that is for each flexible element between the first end and the second end.

27. The sealed conduit system according to claim 19, wherein the rigid second conduit has a seam which at least extends in a longitudinal direction, wherein the seam is formed by welding, or by a mechanical connection.

28. The sealed conduit system according to claim 27, wherein the seam is sealed off.

* * * * *

UNITED STATES PATENT AND TRADEMARK OFFICE
CERTIFICATE OF CORRECTION

PATENT NO. : 10,348,077 B2
APPLICATION NO. : 15/762447
DATED : July 9, 2019
INVENTOR(S) : Johannes Alfred Beele It is certified that error appears in the above-identified patent and that said Letters Patent is hereby corrected as shown below:

On the Title Page

In the Section "Prior Publication Data" please add --US 2019/0207374 A9 Jul. 4, 2019--

In the Specification

At Column 1, Line 11, replace "Sep 24, 2016" with --Sep 24, 2015--

Signed and Sealed this
Twenty-sixth Day of May, 2020

Andrei Iancu
*Director of the United States Patent and Trademark Office*